US009811511B1

(12) United States Patent
Welch et al.

(10) Patent No.: US 9,811,511 B1
(45) Date of Patent: Nov. 7, 2017

(54) METHOD AND APPARATUS OF CREATING CUSTOMIZED COMPUTER-BASED USER DASHBOARD INTERFACES

(75) Inventors: Kevin Todd Welch, Bennington, NE (US); Aric Allyn Ellinghuysen, Omaha, NE (US); Casey Richard Perry, Council Bluffs, IA (US); Elizabeth Ann Dross, Ft. Calhoun, NE (US); Jeffrey Scott Sterup, Wahoo, NE (US)

(73) Assignee: WEST CORPORATION, Omaha, NE (US)

( * ) Notice: Subject to any disclaimer, the term of this patent is extended or adjusted under 35 U.S.C. 154(b) by 187 days.

(21) Appl. No.: 12/725,711

(22) Filed: Mar. 17, 2010

Related U.S. Application Data

(60) Provisional application No. 61/260,145, filed on Nov. 11, 2009.

(51) Int. Cl.
*G06F 17/00* (2006.01)
*G06F 17/22* (2006.01)
*G06F 17/30* (2006.01)

(52) U.S. Cl.
CPC .... *G06F 17/2288* (2013.01); *G06F 17/30991* (2013.01)

(58) Field of Classification Search
CPC ............................... G06F 8/38; G06F 17/2288
USPC .................................................. 715/762, 763
See application file for complete search history.

(56) References Cited

U.S. PATENT DOCUMENTS

| | | | | |
|---|---|---|---|---|
| 5,796,401 A * | 8/1998 | Winer | | 345/619 |
| 6,044,383 A * | 3/2000 | Suzuki et al. | | 715/236 |
| 7,546,543 B2 * | 6/2009 | Louch et al. | | 715/762 |
| 7,747,959 B2 * | 6/2010 | Keller et al. | | 715/764 |
| 7,752,301 B1 * | 7/2010 | Maiocco et al. | | 709/224 |
| 7,870,059 B2 * | 1/2011 | Shapiro et al. | | 705/37 |
| 7,882,013 B2 * | 2/2011 | Shapiro et al. | | 705/37 |
| 8,286,204 B2 * | 10/2012 | Fukuda et al. | | 725/37 |
| 8,479,124 B1 * | 7/2013 | Baxter et al. | | 326/37 |
| 2002/0163535 A1 * | 11/2002 | Mitchell et al. | | 345/744 |
| 2002/0163540 A1 * | 11/2002 | Kishimoto | | 345/762 |
| 2002/0194090 A1 * | 12/2002 | Gagnon et al. | | 705/27 |
| 2003/0222921 A1 * | 12/2003 | Rummel | | 345/788 |
| 2004/0051744 A1 * | 3/2004 | Fukui et al. | | 345/848 |
| 2004/0070627 A1 * | 4/2004 | Shahine et al. | | 345/794 |
| 2004/0199543 A1 * | 10/2004 | Braud et al. | | 707/104.1 |
| 2005/0055635 A1 * | 3/2005 | Bargeron et al. | | 715/525 |
| 2005/0172226 A1 * | 8/2005 | Kobashi et al. | | 715/518 |
| 2005/0172332 A1 * | 8/2005 | Fukuda et al. | | 725/139 |
| 2006/0005207 A1 * | 1/2006 | Louch et al. | | 719/328 |

(Continued)

*Primary Examiner* — Stephen Hong
*Assistant Examiner* — Marshon Robinson
(74) *Attorney, Agent, or Firm* — Raffi Gostanian

(57) ABSTRACT

A method and apparatus of allowing a user to dynamically select a configuration of viewable data displayed via a user's dashboard graphical user interface. The method may include selecting an order of displaying the viewable data on the graphical user interface. The method may also include executing a layout of the graphical user interface to include displaying the viewable data in a first cell portion of the layout of the graphical user interface in an order based on the selecting operation and a designated priority associated with the viewable data. The data in the dashboard graphical user interface will be populated based on the user's preferences and priority associated with the data.

20 Claims, 8 Drawing Sheets

(56) References Cited

U.S. PATENT DOCUMENTS

| | | | |
|---|---|---|---|
| 2006/0029125 A1* | 2/2006 | Kobashi et al. | 375/222 |
| 2006/0053158 A1* | 3/2006 | Hall et al. | 707/102 |
| 2006/0112330 A1* | 5/2006 | Iwasaki | 715/517 |
| 2006/0167704 A1* | 7/2006 | Nicholls et al. | 705/1 |
| 2006/0225032 A1* | 10/2006 | Klerk et al. | 717/105 |
| 2008/0034314 A1* | 2/2008 | Louch et al. | 715/778 |
| 2009/0031248 A1* | 1/2009 | Kano et al. | 715/790 |
| 2009/0106656 A1* | 4/2009 | Handy et al. | 715/709 |
| 2010/0131889 A1* | 5/2010 | Helmolt et al. | 715/804 |
| 2010/0138231 A1* | 6/2010 | Linthicum et al. | 705/2 |
| 2010/0162135 A1* | 6/2010 | Wanas et al. | 715/753 |
| 2010/0205567 A1* | 8/2010 | Haire et al. | 715/840 |
| 2011/0099487 A1* | 4/2011 | Pyhalammi et al. | 715/762 |
| 2013/0031460 A1* | 1/2013 | Nordback | 715/234 |

\* cited by examiner

METHOD AND APPARATUS OF CREATING CUSTOMIZED COMPUTER-BASED USER DASHBOARD INTERFACES

CROSS-REFERENCE TO RELATED APPLICATIONS

This application is a non-provisional of and claims priority from U.S. Patent Application No. 61/260,145, filed on Nov. 11, 2009 entitled DASHBOARD.

TECHNICAL FIELD OF THE INVENTION

This invention relates to a method and apparatus of providing user interfaces of management software and related systems. More particularly, this invention relates to a method, apparatus, and computer program product that permits dynamic user manipulation of data within a browser-based user interface.

BACKGROUND OF THE INVENTION

Enterprise management and large-scale management systems utilize an integrated business system that may include resource planning, customer management efforts and other business capabilities. Such a management system may be scaled down to a single user interface that is accessible via an individual computing device (e.g., computer, hand-held computer, data processing device, etc). Users operating such an interface may refer to their personal workspace or graphical user interface as a dashboard.

The exact layout of the user's dashboard may include one or more of a plurality of data elements that represent information stored in a remote server and/or database. These data elements may be arranged to accommodate the needs of a particular user. For example, a customized user profile may be created for each user to satisfy the viewing and access privileges of that user enabling him or her to perform the necessary job requirements (i.e., managing data records assigned to that particular user).

Conventional user interface dashboards were setup and preconfigured based on the client's needs and were not configurable or reconfigurable to accommodate the individual user's preferences. Such a limited dashboard look and feel failed to provide the user with the appropriate dynamic computing environment required to perform his or her job functions.

SUMMARY OF THE INVENTION

One example embodiment of the present invention may include a method of dynamically allowing a user to select a configuration of viewable data displayed via a user's graphical user interface. The method may include selecting an order of displaying the viewable data on the graphical user interface. The method may also include executing a layout of the graphical user interface to include displaying the viewable data in a first cell portion of the layout of the graphical user interface in an order based on the selecting operation and a designated priority associated with the viewable data.

Another example embodiment of the present invention may include an apparatus configured to dynamically allow a user to select a configuration of viewable data displayed via a user's graphical user interface. The apparatus may include an input device configured to accept a user input order of displaying the viewable data on the graphical user interface. The apparatus may also include a processor configured to execute a layout of the graphical user interface to display the viewable data in a first cell portion of the layout of the graphical user interface in an order based on the user input order and a designated priority associated with the viewable data.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
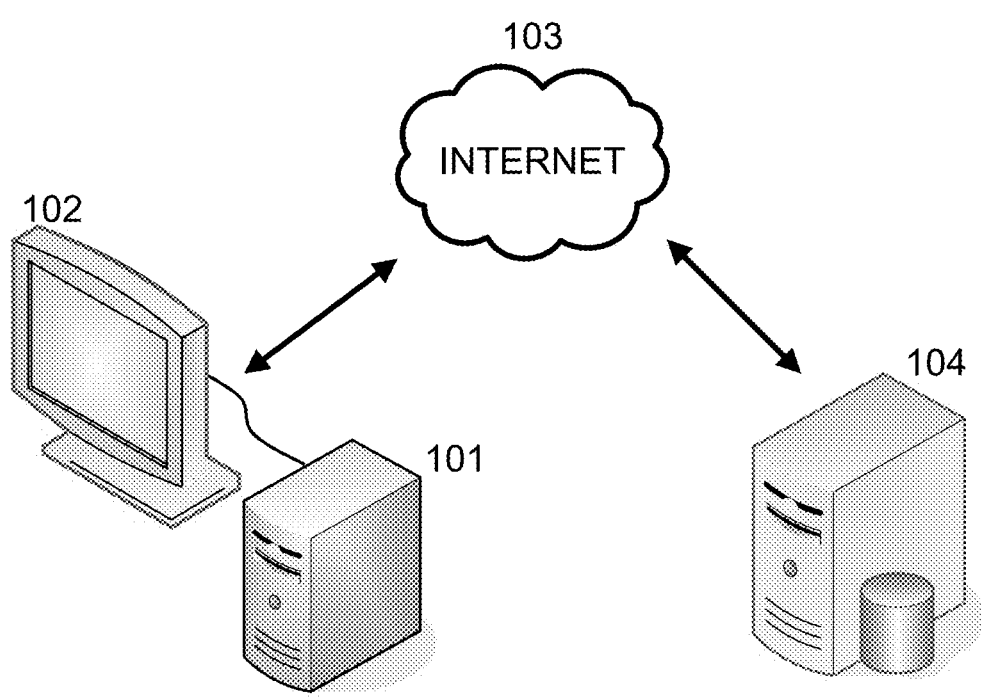
FIG. 1 illustrates a computer network configuration configured to support example embodiments of the present invention.

FIG. 1 illustrates a basic network configuration according to example embodiments of the present invention. Referring to FIG. 1, a computer processing device or computer 101 includes a monitor 102 that may be operated by a user. When operating the computer 101, the user may view and perform modifications to his or her own customized dashboard GUI. The user may access data stored in the memory of the computer 101 and/or information stored in a remote server or database 104. Access to the remote server 104 may be provided by wired line access or wirelessly to a private network and/or across the Internet 103. The user may receive real-time information updates displayed on his or her dashboard.

To understand the functionality and parameters associated with a user's dashboard, it is important to understand certain nomenclature and terminology associated with the dashboard elements. A project may be a particular self-explanatory term related to an individual project being owned by a particular client and worked on by a particular user. For example, a client can have more than one project but ownership of a project can be to only one client. Each project specifies a certain type of data. For example, an application, such as, "call center project", would be associated with a particular data record, such as, "customer address information" to be gathered for the client.

Users may be referred to as the persons or individuals that actually interact with the system via their customized dashboard GUIs. Users may be identified by a single username, but can access multiple projects through their user accounts. User accounts each notify the system that a particular user has access to a specific project. User permissions may be associated with each account, which has permission entries that inform the system what system features the user has access to within the project. Those access control features are specified by the user account. User permissions may also grant full control or read-only access to a feature mode, described in detail below.

Features themselves may be broken into two components. The first being the overall feature type and the second being a mode of a feature. Features store information such as the memory location of a feature and its identifier or name. Features may be the conceptual components that are linked to web pages, which may be used as references. Feature modes represent a different behavior for a particular feature. Similar to the concept of polymorphism, modes allow a feature to behave in different ways. For example, consider an administrative access mode and a basic access mode, the administrative access mode will appear similar (or the same) as the basic access mode. However, the administrative mode may perform differently and provide more functionality not offered to the basic access mode. Implementing further feature modes at a project level may add another level of granularity.

Page Operations are "modes" that only the corresponding web page is associated with, and which perform a particular function (i.e. 'update_toggle_settings'). Page operations provide features related to access restrictions, such as, a feature mode 'toggle_admin' would allow all page operations to be performed but a 'toggle_basic' would only allow a handful of operations to be performed due to access restrictions.

Project feature modes are features that a project has been granted access to use. Users with accounts linked to a project are limited to use only those features that have been granted to them and have also been granted to that project. Feature restriction may be implemented to limit users who are granted access to a particular feature mode. In other words, the feature restriction may be a restriction on how the user may operate a feature mode. Otherwise, a user may use the feature as the feature mode defines that feature to work.

Feature mode inheritance between users is another possible function that provides a way to inherit feature modes among users. For example, an administrator may provide full access administrative privileges to another user that the administrator already possesses. Whereas other users can only give the permissions that they themselves have, assuming they even have the ability to grant permissions.

Another level of administration may be defined as site administrators, which are the ultimate authorities of the system administration. These site account users can transverse all projects and are not limited by accounts or permissions within the system. Other access options may include project creation, granting feature mode rights to users, and providing project administration access to lower level administrators.

According to example embodiments of the present invention, the components and fundamental elements/sub-elements of the dashboard may be defined as a set of parameters. Those parameters may be part of a hierarchy of data parameters that establish a set of viewable data within the boundaries of the dashboard. For example, a table may be used to display a layout of data fields. The table may be broken down into quadrants of equal size.

According to one example, there may be a maximum number of horizontal table quadrants, such as, three, and vertical quadrants, such as, twelve. However, that number of quadrants in either direction may be variable and may be customized by the user. Generally, the quadrants should be of equal size to minimize design discrepancies. A cell may be a visible container that is within a table and contains certain content that may be displayed within the table. Generally, a cell may be rectangular in shape and can span multiple quadrants. A cell may be limited to expanding to a maximum of three quadrants horizontally and vertically.

In order for a cell to exist and be visible to the user it should be assigned at least one quadrant horizontally and vertically. A cell's content may be visible at its position within the table. A cell may have a connection to a particular layout. For example, a cell may be attached to a single layout and have a priority number that is representative of its place among the other cells attached to the same layout. The content of the cell may be one or several different types of content. In one example, a cell may include one type of content at a time.

Certain cell content types may include, for example, a chart that includes a graphical form of data. Other types of cell content may include a raw data view that includes raw textual or another type of data viewable by the user, and an external plug-in type of cell content, such as, a custom form of data (web control feature) that pulls the data into the cell via the plug-in feature.

Referring to a chart specifically, a chart may be composed of multiple components, such as, a flash file used to draw the chart (i.e., a *.swf file). The chart may further include a browser plug-in that is used to run the flash file (i.e., Adobe® Flash). The chart may also include XML data that is sent into the chart. The XML data may include chart configuration information, chart data, and other attributes that define the chart's characteristics (i.e., legend, size, color, type, etc.). Charts and raw data views may provide viewing capabilities for multiple data sets and quantitative data. A raw data view shares the same XML data that charts use, but displays the data as a table.

According to example embodiments of the present invention, there may be more than one type of chart. For example, a standard chart may include historical data representing the present and a set time from the past (e.g., a time frame between the present and 30 seconds prior to the present). Another example chart may be a real-time chart that presents the most recent moment-in-time information. For example, an application that reports real-time platform statistics such as simultaneous port usage may be used to populate the chart data.

External plug-ins may also be used to provide content to the dashboard's features and attributes. The plug-ins may allow features to be included that are outside of operations of the dashboard's content repository. Some examples of external plug-ins may include data video and/or audio content and/or real time updated chart data. Such data content may be considered a plug-in for purposes of customizing a dashboard.

A chart may receive its XML request data in more than one way. For example, the chart may receive its XML data via a flash object function that performs an HTTP request to a uniform resource locator (URL) to obtain the data. In another example, a JAVA script ("Javascript") may perform an HTTP request to a URL to obtain the XML. Raw data views and external plug-ins may then receive their data as a result of the JavaScript HTTP request.

The data for charts and raw data views comes from a chart web service. For example, the chart web service may be called along with a unique cell identification (cell ID) number to gather data based on that unique cell ID of the particular cell in the dashboard. The chart web service will format the data results into a XML format and apply certain styling and formatting to the XML as specified by the cell's attributes.

The content for an external plug-in may be provided by a URL that is specified by the cell's attributes. A web service does an HTTP request to the specified URL and returns the content of the cell. The cells have attributes that describe which type of content the cell will display along with certain chart settings and styling attributes to provide a customized cell presentation format.

Cells have a unique ID, priority, row span and column span as well as other attributes that identify the cell's appearance and characteristics. For example, cells may have a corresponding refresh rate to determine when the data is updated and other attributes, however, refreshing can be turned off for a cell.

Standard charts are first loaded when the page is loaded using the chart object's function code, which pulls XML data for the chart from the chart web service. Raw data views and external plug-ins may be loaded by JavaScript the first time the page loads. Standard charts, raw data views and external plug-ins are refreshed by a recurring JavaScript HTTP request to the chart web service for the XML data. Standard charts are refreshed using their chart object's function code.

Real-time chart objects are unique functions that continually request and update their content without the aid of JavaScript. The data used by standard charts and raw data views is defined by datasets. A dataset is connected to a single cell and has a function that is used to determine what data it will return, and a time range offset from the time range specified by the cell (i.e. now or last week).

A dataset's function is defined as a statement that is interpreted by the chart web service into a database query used to search for the type of information represented by the function. The data the function specified is returned by the web service as XML data.

The table and cells displayed on the dashboard are generated by a quadrant class. Information pertaining to each cell is provided into the quadrant class. For example, information, such as, priority—relative position within the table, columns—number of quadrants the cell is to extend horizontally into, rows—number of quadrants the cell is to extend vertically into, and content—the content to display within the cell container. The quadrant class refers to the table to be constructed as a quadrant grid, and the quadrants are identified by x and y coordinates within the quadrant grid.

The cell positions are determined by their priorities. The order of placement is left to right and top to bottom by ascending priority number. The quadrant class determines a cell's necessary quadrants by the cell's columns and rows. The quadrants are then reserved for the cells within the quadrant grid. Cell placement within the quadrant grid is based on the order of the placement. For example, navigation through the quadrant grid will provide coordinates x and y that are set to zero. The quadrant class proceeds to increment the x coordinate, an algorithm may be used, such as, if modulo three of x is zero then set x to zero and increment y, and, if y is greater or equal to 12 then exit the cell placement function.

Regarding cell placement, the current placement priority number may be defined and set to one. The cell of the current placement priority number may be placed on the quadrant grid aligning the cell's top left corner to the current x and y coordinates. If the cell does not fit on the quadrant grid and/or the cell overlaps quadrants reserved for other cells then the x and y coordinates may be incremented and an attempted replacement operation may be performed. If the cell does fit on quadrant grid and does not overlap other reserved quadrants then it may be reserved with the quadrants for the cell. Next, the current placement priority number may be incremented. If the current placement priority number is greater than the maximum priority number of the cells then the cell placement function may be exited and a function to create the table may be called.

After the placements have been reserved on the quadrant grid, a table is created using the information provided by cell attributes and the quadrant grid. Each cell that is created is given an ID that corresponds to its priority. The priority number is then used by JavaScript to perform the necessary cell content refreshes.

Figure 2:
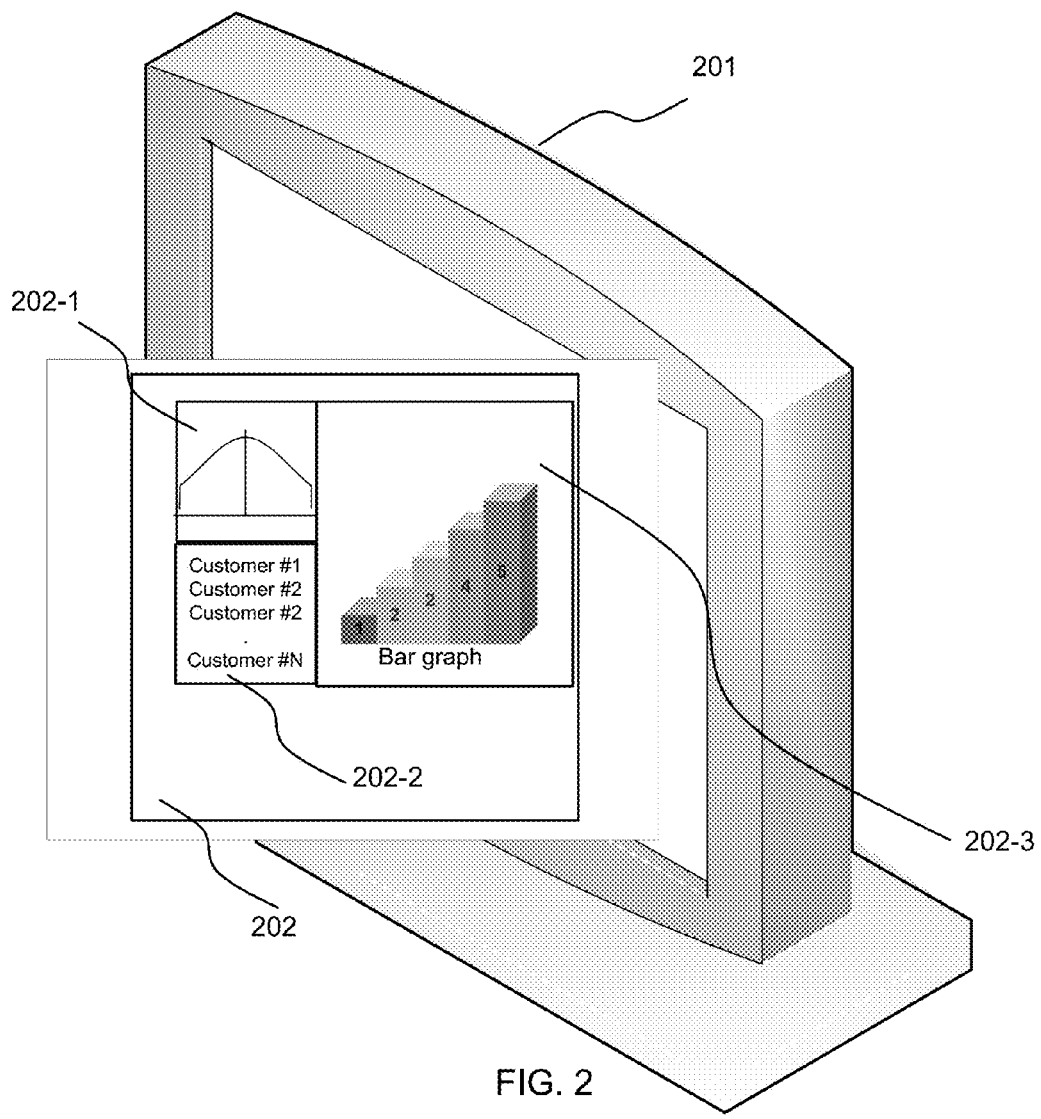
FIG. 2 illustrates a dashboard graphical user interface on a display device according to example embodiments of the present invention.

FIG. 2 illustrates an example of a display device 201 with an exploded view of an example dashboard, according to example embodiments of the present invention. Referring to FIG. 2, a table 202 includes cells 202-1 through 202-3. Cell 202-1 represents a line graph curve that is based on data that is retrieved from a remote database or URL link. Cell 202-2 is an example of raw data which may be accessed from a database file record of customer accounts. Cell 202-3 is a bar graph which is a different type of graph from cell 202-1, however its data may be retrieved in a similar manner.

According to example embodiments of the present invention, the dashboard access restriction procedures may provide users with various functionality based on their rights and permissions. For example, a user may have rights to one or more project accounts and each account allows access to one project. Each account has feature mode permissions which determine the feature modes available to a particular user.

A project is authorized to use certain feature modes and operations are restricted by feature modes. Features may have multiple modes that allow the feature to behave differently for each of the feature modes available to that feature. For example, a user may have the rights to access the toggle GUI. The user may have administrative rights, read only access, or the ability to only setup toggles as opposed to the rights to setup toggles and manipulate them. The features may be mapped to actual web pages which contain operations that are performed by the page. The permissions available to a particular user will specify the feature mode that a web page will offer that user.

In order to setup the dashboard, a set of setup procedures may be executed according to example embodiments of the present invention. For example, a user may login by entering the correct web address, a username and password. The password may be encrypted in the database and only the user may know his or her password. The user may change his or her password when logging in.

A menu may appear, upon logging in, that displays various menu options, such as, layouts that are specific to the user's dashboard (e.g., current, historical, administrative, projects, logout, etc.). The administrative option, if available to the user, will provide features, such as, add, edit and delete menus, users, layouts and other functions. Based on certain permissions, the user may only be able to view an existing menu item and not add or delete menu items. Menu items may be created, named and assigned a parent item and linked to an external or internal link.

The layout represents the web page layout design of an individual web page. Users may create layouts that have several cells that contain data. Data may be in the form of charts, raw data or a custom URL. According to one example, there may be six operations to creating a new layout. Those operations include naming the layout, creating a new cell, selecting a cell detail, adding data to a cell, edit data details and cell placement. As noted above, the cell can be a chart, raw or custom type.

Setting up a chart may include refresh and update intervals specified by the user. For example, to display a line chart that displays data in hourly intervals, the history count may be set to have an hourly interval with a frequency of one hour. Next, the data details may be entered, such as, the data name which may appear in the chart legend and/or heading. To illustrate a four week average, a trend range may be entered, such as, "7+14+21+28." To see only the current time items, then a "0" may be entered.

Cell placement may also be an option in the dashboard setup procedure. Cells may have parameters, such as, width, height and priority. When multiple cells are displayed in a layout, priority will indicate what order the cells are displayed. The user can preview the layout of the dashboard by accessing a layout manager view option.

Figure 3:
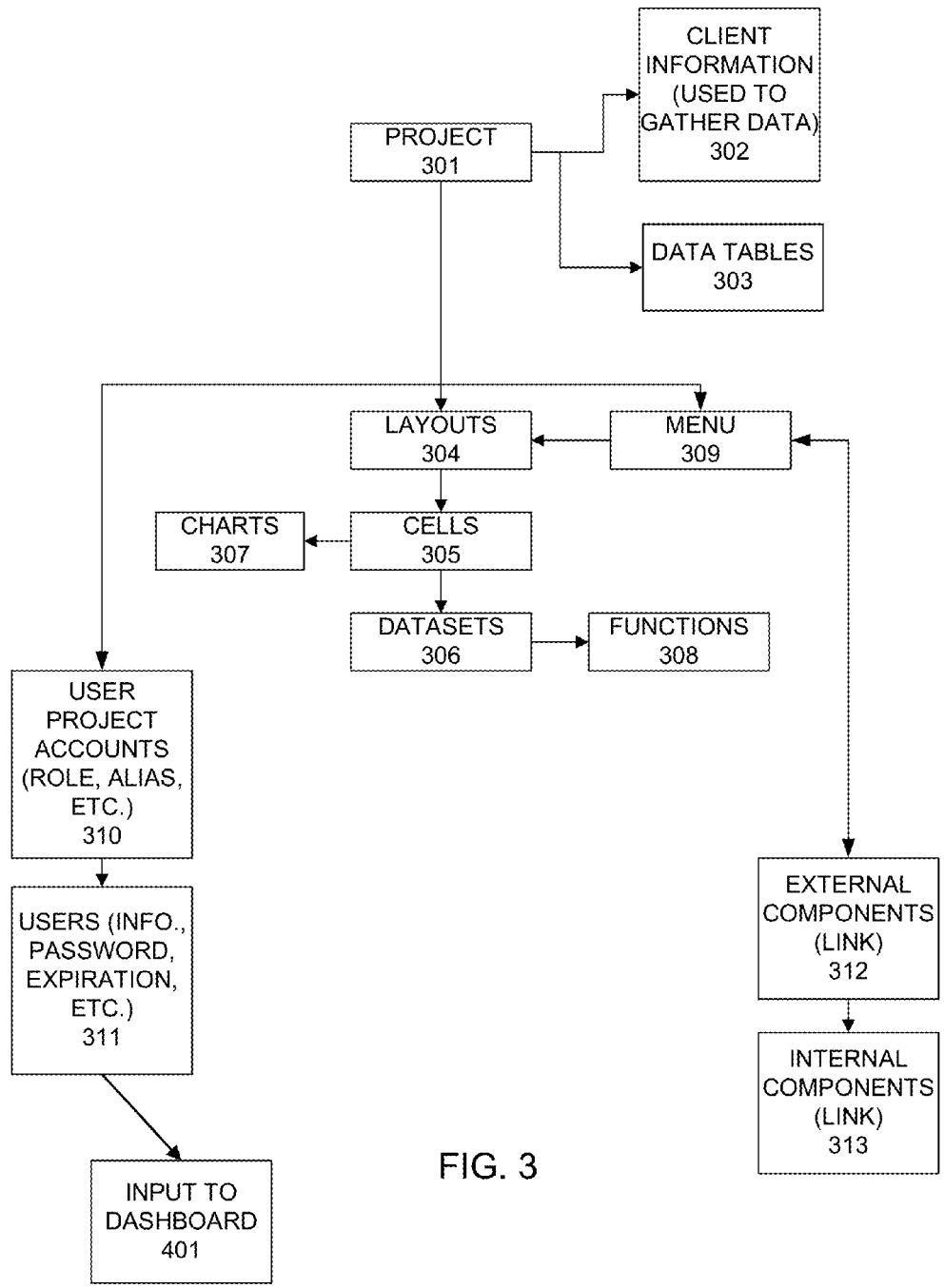
FIG. 3 illustrates a logic diagram illustrating the components of the dashboard graphical user interface, according to example embodiments of the present invention.

FIG. 3 illustrates the components and features of a project, according to an example embodiment of the present invention. Referring to FIG. 3, project 301 represents a set of data that defines a single client project, which, in turn, can encompass multiple applications under that particular client. 302 illustrates a set of data that identifies client specific information, 303 illustrates information that metrics on the dashboard are derived from, 304 represents the layout design of an individual web page. Component 305 illustrates the individual container of data that is to be displayed, and how the data is visibly presented. Component 306 illustrates the results of the calculations of the functions, and also defines the time intervals that the calculations need to cover.

Referring again to FIG. 3, component 307 illustrates a graphical representation of the datasets, 308 illustrates a mathematical expression that is used to build the dataset data. Component 309 illustrates menu options available to the user, such as, layouts that are specific to the user's dashboard, which may be based on permissions. Component 310 illustrates certain features and modes that a user may have access to and maybe authorized to access. Component 311 illustrates the types of user authentication information (login, passwords and duration of access). Component 312 illustrates the external links a user may define within the menu and component 313 illustrates a layout or plugin that may be linked to the menu.

A user views the dashboard at a project level. The user will see all attributes their rights entitle them to view. The user will have a menu that will be linked to internal or external components.

Figure 4A:
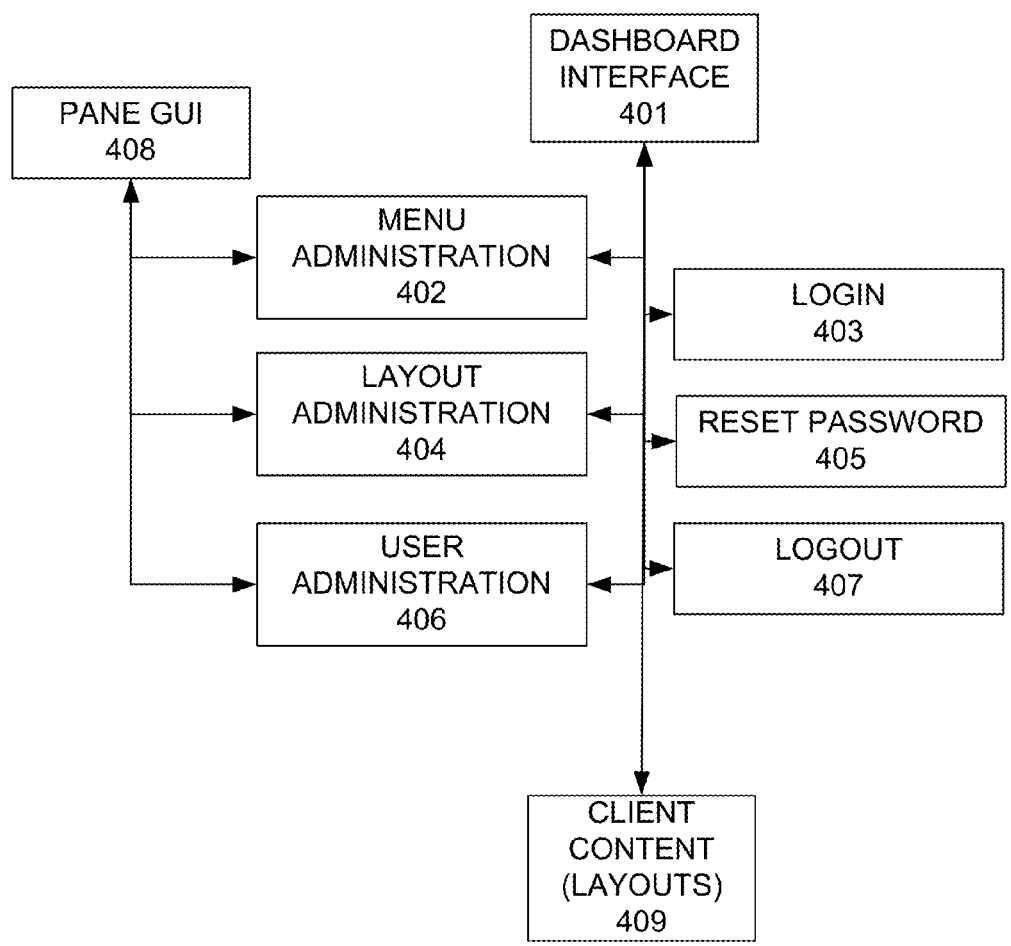
FIGS. 4A and 4B illustrate a logic diagram illustrating administration and data source features of the dashboard graphical user interface, according to example embodiments of the present invention.

FIG. 4A illustrates an example of the authentication and authorization that is required to dynamically build the menu and dashboard layout content, according to example embodiments of the present invention. Referring to FIG. 4A, component 401 illustrates a dashboard interface that encapsulates the dashboard information, component 402 illustrates the menu administration GUI, component 403 illustrates a login screen interface, component 404 illustrates a layout administration GUI, component 405 illustrates a reset password administration interface, component 406 illustrates the user administration GUI, and component 407 illustrates a logout link that renders the session unusable.

Continuing with FIG. 4A, component 408 illustrates a drag and drop overlay on the current browser window that allows various adjustments, and would typically contain form elements. Component 409 illustrates information content displayed in either chart or raw data form. This configuration allows a user to change various administrative configurations within the application.

Figure 4B:
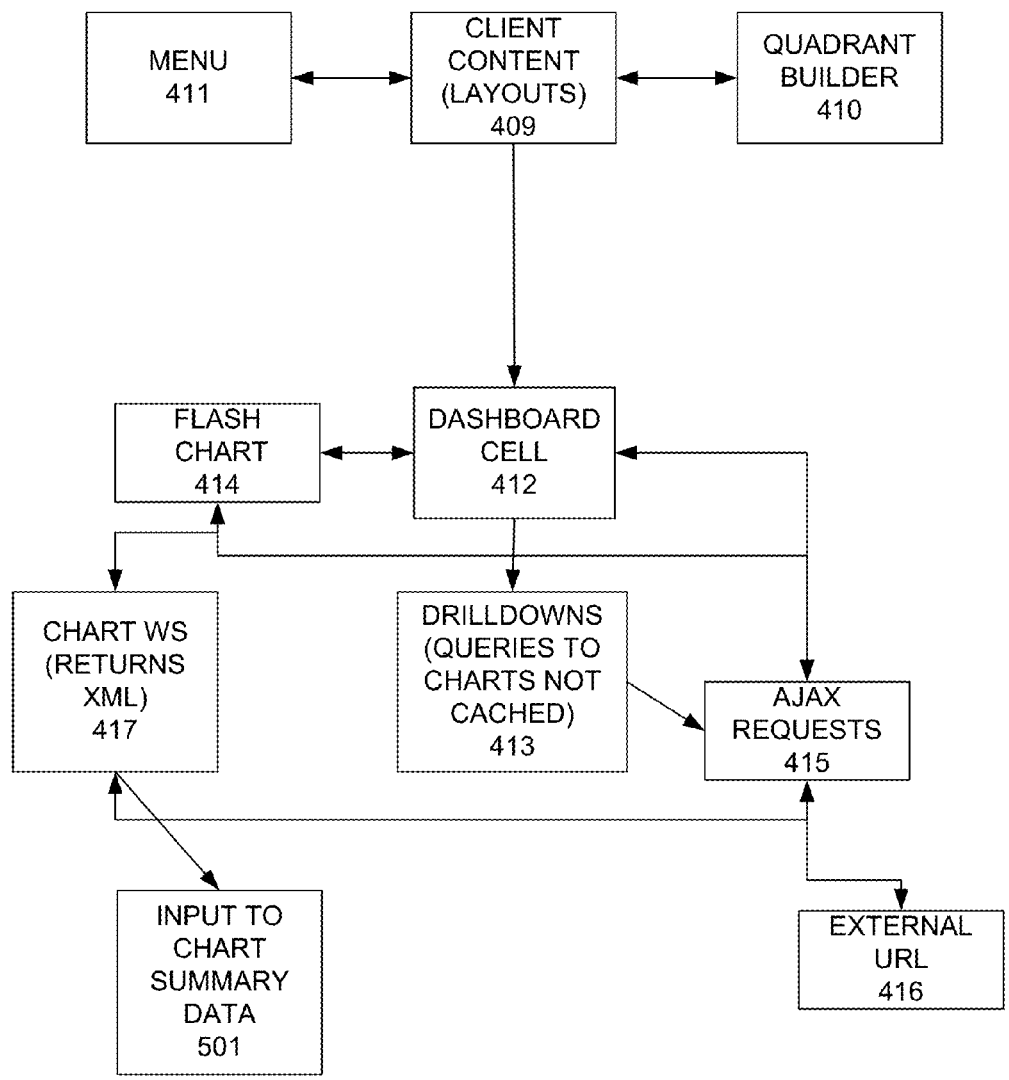

FIG. 4B illustrates the content construction configurations of the dashboard, according to example embodiments of the present invention. Referring to FIG. 4B, component 410 illustrates a quadrant builder application that provides a procedure that dynamically sizes and places cells by priority, width, height, etc. Component 411 illustrates a menu that contains links to layouts or external content. Component 412 illustrates an adjustable content container of a dashboard cell. Component 413 illustrates a drilldown of queries to charts not cached view of detail data extracted from a dashboard cell.

FIG. 4B further illustrates component 414, which illustrates a flash chart graphical representation of dashboard cell data. Component 415 illustrates a JavaScript HTTP request (AJAX) and, component 416 illustrates external data hosted outside of the current domain. Component 417 illustrates a web service (WS) that summarizes and formats database requests and returns them to a dashboard cell for presentation to a user. The XML data may represent the content presentation layer. In operation, a user selects a link from the menu, which, in turn, creates a layout. The quadrant builder formats the layout while each individual cell performs a web service request and presents the data to the user in a graphical format.

Figure 5:
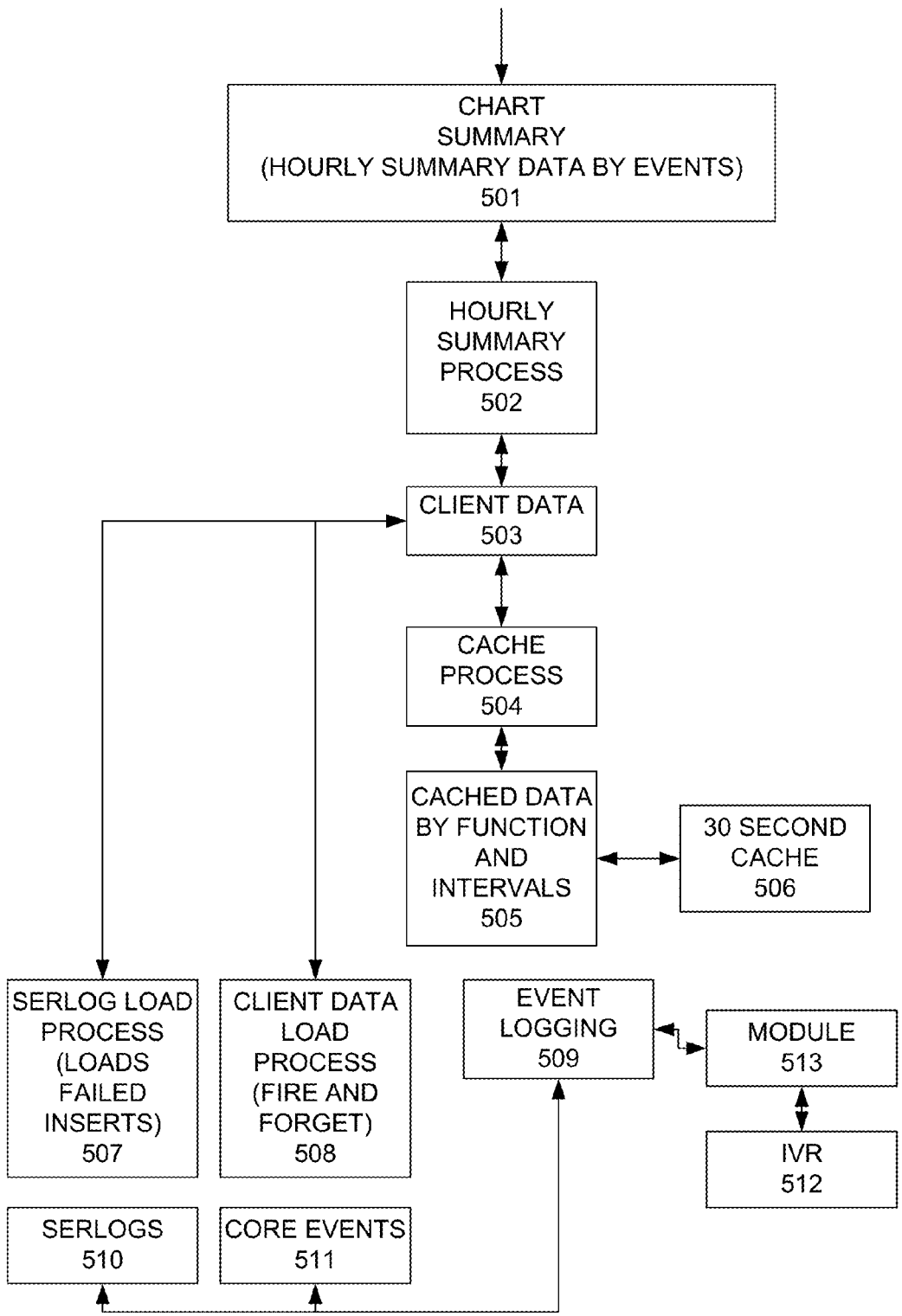
FIG. 5 illustrates a logic diagram illustrating components of the data processes performed with the dashboard graphical user interface, according to example embodiments of the present invention.

FIG. 5 illustrates an example operation of how the data is retrieved, stored, and summarized, according to example operations of the present invention. Referring to FIG. 5, component 501 illustrates data that has been summarized from detailed reports into hourly increments. Component 502 illustrates the data summarization process from the detailed data chart into hourly increments. Component 503 illustrates a further increment and/or finalization procedure of the user presentation data based on the data chart.

Continuing with FIG. 5, the cache process and cached data by function and interval component 504 and 505 represent summarized data stored in memory. Component 506 illustrates time summarized data that is stored in memory. Component 507 illustrates a process that builds raw data in a text file format, and component 508 illustrates a database load process of detailed data being accessed. Component 509 illustrates the trigger that an event took place, and component 510 illustrates the raw data in a text format being generated. Component 511 illustrates the detailed data having been organized, and component 512 illustrates the application where the information was gathered. Component 513 illustrates an application that generates raw data via an interactive voice response system (IVR).

In operation, the IVR application 513 collects raw information. The information is sent to the event logging which in turn formats the data into usable information to be displayed within the dashboard for user review.

Figure 6:
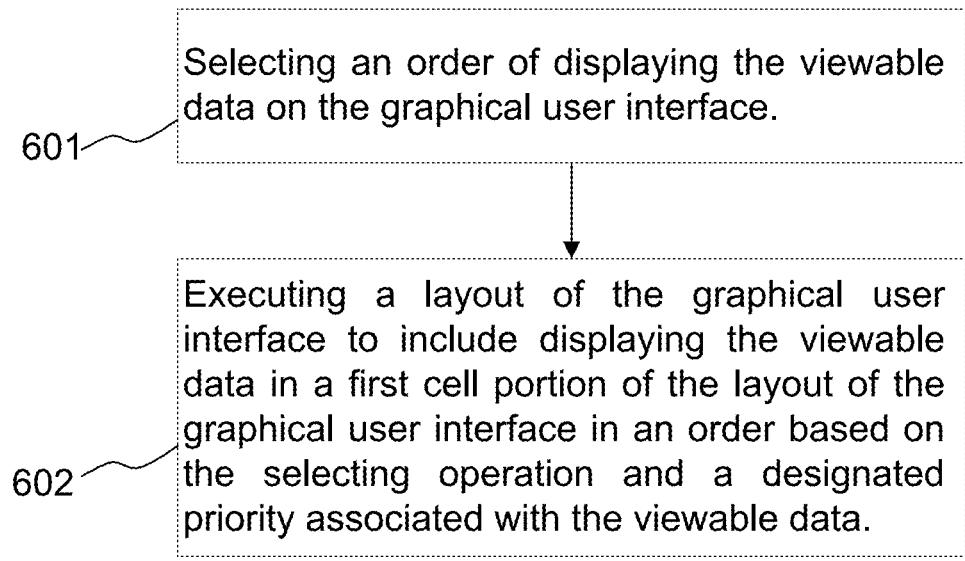
FIG. 6 illustrates a flow diagram illustrating an example method, according to example embodiments of the present invention.

One example embodiment of the present invention may include a method that is illustrated in FIG. 6. The method may include dynamically allowing a user to select a configuration of viewable data displayed via a user's graphical user interface. The method may include selecting an order of displaying the viewable data on the graphical user interface, at operation 601. The method may also include executing a display interface layout of the graphical user interface to include displaying the viewable data in a first cell portion of the layout of the graphical user interface in an order based on the selecting operation and a designated priority associated with the viewable data, at operation 602.

The operations of a method or related algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components 101, 102, 103 and 104.

Figure 7:
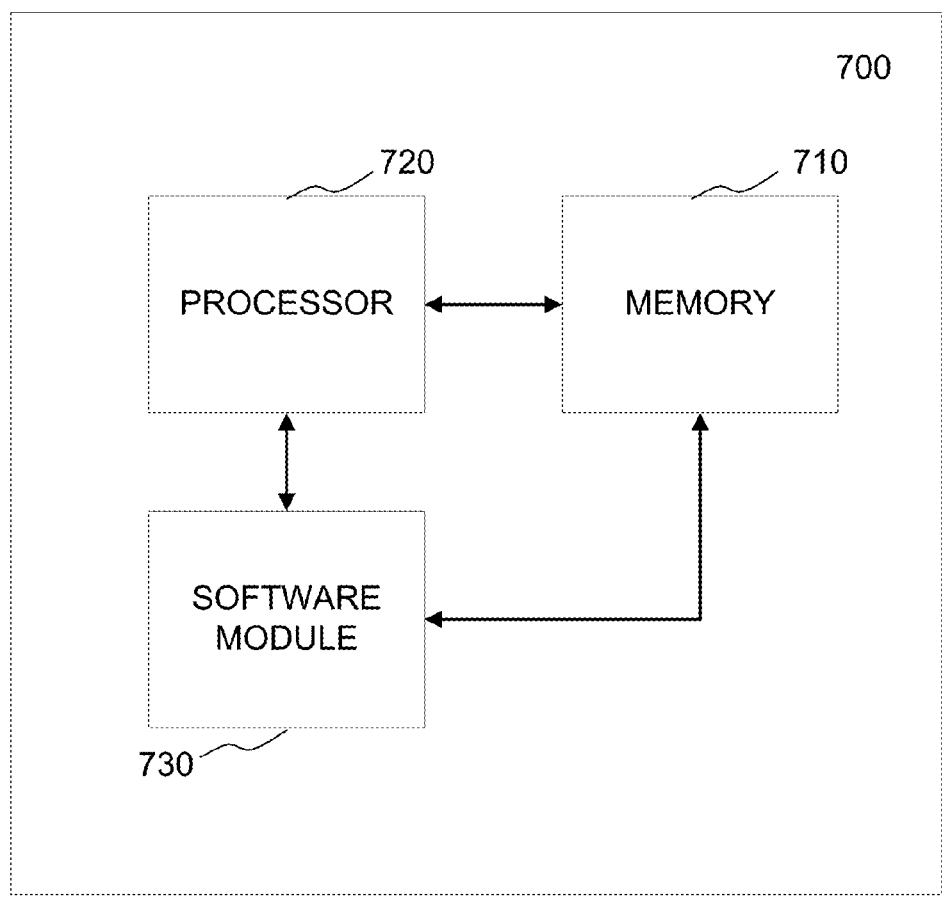
FIG. 7 illustrates a computer component configured to store and perform software operations, according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of dynamically allowing a user to select a configuration of viewable data displayed via a user's graphical user interface, the method comprising:
    selecting an order of displaying the viewable data on the graphical user interface; and
    executing a layout of the graphical user interface to include displaying the viewable data in a first cell portion of the layout of the graphical user interface in an order based on the selecting operation and a designated priority associated with the viewable data, wherein
    when the viewable data in the first cell portion of the layout fails to fit within the first cell portion and overlaps into another cell portion reserved for other viewable data, x and y coordinates of the first cell portion are incremented and a replacement operation for executing the layout is performed, and
    when a plurality of cells are displayed in the layout, a priority indicates an order for which the plurality of cells are displayed, and each of the priority of cells are assigned an identification that corresponds to the priority.

2. The method of claim 1, wherein the order comprises a first position beginning at a first corner of the layout of the graphical user interface and a next position being a position contiguous with the first position.

3. The method of claim 2, wherein the next position is towards at least one of the right and left of the first position or directly underneath the first position.

4. The method of claim 1, further comprising:
    dynamically adjusting at least one of the width and height of the first cell displayed on the graphical interface.

5. The method of claim 1, further comprising:
    dynamically adjusting a data format of the viewable data to be displayed on the graphical user interface.

6. The method of claim 1, wherein the data format is at least one of a chart, raw data, and a customized user format.

7. The method of claim 1, further comprising:
    adding at least one additional cell to the layout of the graphical user interface, wherein the at least one additional cell is placed in a position based on its designated priority.

8. The method of claim 7, wherein the designated priority of the at least one additional cell is based on an incrementing algorithm that increments the first cell and continues to increment new cells that are introduced subsequent to the at least one additional cell.

9. An apparatus configured to dynamically allow a user to select a configuration of viewable data displayed via a user's graphical user interface, the apparatus comprising:
    an input device configured to accept an user input order of displaying the viewable data on the graphical user interface; and
    a processor configured to execute a layout of the graphical user interface to display the viewable data in a first cell portion of the layout of the graphical user interface in an order based on the user input order and a designated priority associated with the viewable data, wherein
    when the viewable data in the first cell portion of the layout fails to fit within the first cell portion and overlaps into another cell portion reserved for other viewable data, x and y coordinates of the first cell portion are incremented and a replacement operation for executing the layout is performed, and
    when a plurality of cells are displayed in the layout, a priority indicates an order for which the plurality of cells are displayed, and each of the priority of cells are assigned an identification that corresponds to the priority.

10. The apparatus of claim 9, wherein the order comprises a first position beginning at a first corner of the layout of the graphical user interface and a next position being a position contiguous with the first position.

11. The apparatus of claim 10, wherein the next position is towards at least one of the right and left of the first position or directly underneath the first position.

12. The apparatus of claim 9, wherein the processor is further configured to dynamically adjust at least one of the width and height of the first cell displayed on the graphical interface.

13. The apparatus of claim 9, wherein the processor is further configured to dynamically adjust a data format of the viewable data to be displayed on the graphical user interface.

14. The apparatus of claim 13, wherein the data format is at least one of a chart, raw data, and a customized user format.

15. The apparatus of claim 9, wherein the processor is further configured to add at least one additional cell to the layout of the graphical user interface, wherein the at least one additional cell is placed in a position based on its designated priority.

16. The apparatus of claim 15, wherein the designated priority of the at least one additional cell is based on an incrementing algorithm that increments the first cell and continues to increment new cells that are introduced subsequent to the at least one additional cell.

17. A computer program embodied on a non-transitory computer readable storage medium, the computer program is configured to cause a processor to dynamically allow a user to select a configuration of viewable data displayed via a user's graphical user interface, the processor configured to:
    select an order of displaying the viewable data on the graphical user interface; and
    execute a layout of the graphical user interface to include displaying the viewable data in a first cell portion of the layout of the graphical user interface in an order based on the selecting operation and a designated priority associated with the viewable data, wherein
    when the viewable data in the first cell portion of the layout fails to fit within the first cell portion and overlaps into another cell portion reserved for other viewable data, x and y coordinates of the first cell portion incremented and a replacement operation for executing the layout is performed, and
    when a plurality of cells are displayed in the layout, a priority indicates an order for which the plurality of cells are displayed, and each of the priority of cells are assigned an identification that corresponds to the priority.

18. The computer program of claim 17, wherein the order comprises a first position beginning at a first corner of the layout of the graphical user interface and a next position being a position contiguous with the first position.

19. The computer program of claim 18, wherein the next position is towards at least one of the right and left of the first position or directly underneath the first position.

20. The computer program of claim 17, wherein the processor is further configured to:
    dynamically adjust at least one of the width and height of the first cell displayed on the graphical interface.

* * * * *